US008319985B2

(12) United States Patent
Tsuboi et al.

(10) Patent No.: US 8,319,985 B2
(45) Date of Patent: Nov. 27, 2012

(54) PRINTING EVEN THOUGH IMAGE DATA FROM A SERVER CANNOT BE ACQUIRED FOR PRINTING

(75) Inventors: Tomo Tsuboi, Itami (JP); Tomoyuki Okamoto, Suita (JP); Yasuji Takeuchi, Kobe (JP); Nobuo Kamei, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 742 days.

(21) Appl. No.: 12/546,814

(22) Filed: Aug. 25, 2009

(65) Prior Publication Data

US 2010/0053660 A1 Mar. 4, 2010

(30) Foreign Application Priority Data

Sep. 3, 2008 (JP) .................. 2008-226026

(51) Int. Cl.
*G06K 15/00* (2006.01)
*G06F 3/12* (2006.01)
(52) U.S. Cl. ..................... 358/1.14; 358/1.15
(58) Field of Classification Search .............. 358/1.14, 358/1.15
See application file for complete search history.

(56) References Cited

U.S. PATENT DOCUMENTS

| 2007/0171456 A1 | 7/2007 | Shimazaki |
| 2007/0177187 A1 | 8/2007 | Hisatomi |
| 2007/0177205 A1 | 8/2007 | Yamada et al. |

FOREIGN PATENT DOCUMENTS

| JP | 09-321962 | | 12/1997 |
| JP | 11-134125 | A | 5/1999 |
| JP | 2000-253380 | | 9/2000 |
| JP | 2006-191201 | | 7/2006 |
| JP | 2007-69539 | A | 3/2007 |
| JP | 2007-199779 | | 8/2007 |
| JP | 2007-203524 | A | 8/2007 |
| JP | 2007-257069 | A | 10/2007 |
| JP | 2008-193733 | | 8/2008 |
| WO | WO 2006/001386 | | 1/2006 |

OTHER PUBLICATIONS

Notification of Reasons for Refusal issued in the corresponding Japanese Patent Application No. 2008-226026 dated Jun. 29, 2010, and an English Translation thereof.

*Primary Examiner* — Marivelisse Santiago Cordero
*Assistant Examiner* — Eric A Rust
(74) *Attorney, Agent, or Firm* — Buchanan Ingersoll & Rooney PC

(57) ABSTRACT

The present invention provides an image formation apparatus that reconstructs and prints a document based on document data written in a markup language. The image formation apparatus arranges, by using browser software, text data included in the document data within a page of the document, and acquires image data from servers and arranges the image data within the page of the document. If the image formation apparatus fails to acquire one or more pieces of the image data, it judges whether each of the pieces of image data is important or not according to the attribute information of the image data. If judged negatively, the image formation apparatus executes printing of the document reconstructed based on the text data and/or the acquired pieces of image data. If judged affirmatively, the image formation apparatus cancels the printing of the reconstructed document.

12 Claims, 11 Drawing Sheets

FIG. 3

```
<?xml version="1.0" encoding="Shift_JIS" ?>
<!DOCTYPE html PUBLIC "-//W3C//DTD XHTML 1.0 Transitional//EN"
"http://www.w3.org/TR/xhtml1/xhtml1-Transitional.dtd" >
<html xmlns="http://www.w3.org/1999/xhtml" lang="ja" xml:lang="ja" >
<head>
<meta http-equiv="content-type" content="text/html;charset=Shift_JIS" />
<meta http-equiv="content-style-type" content="text/css" />
<meta http-equiv="content-script-type" content="text/javascript" />
<meta name="description" content="description" />
<meta name="keywords" content="keyword" />
<title>title</title>
<style type="text/css" >  ~301
.sample1{ font-size:20px; line-height:20px; } ~302
.sample2{ position:absolute; top:100px; left:50px; width:50px; height:50px; } ~303
</style> ~304
</head>
<body> ~305
<p class="sample1" >The texts described here is to be displayed in the font designated ⎤~306
at sample1. The image is displayed at the position designated at sample2.</p>
<p class="sample2" ><img src="http://konicaminolta.jp/gazou.gif" alt="Explanation ⎤~307
of the image" /></p> ~308
</body>
</html>
```

| Identification number | Low-importance URL list |
|---|---|
| 1 | http://www.xxx.jp/ad1/ |
| 2 | http://www.xxy.jp/ad2/ |
| 3 | http://www.zza.com/ |
| ⋮ | ⋮ |

PRINTING EVEN THOUGH IMAGE DATA FROM A SERVER CANNOT BE ACQUIRED FOR PRINTING

CROSS-REFERENCE TO RELATED APPLICATION

This application is based on application No. 2008-226026 filed in Japan, the contents of which are hereby incorporated by reference.

BACKGROUND OF THE INVENTION (1) Field of the Invention

The present invention relates to an image formation apparatus. In particular, the present invention relates to a technique to control printing by an image formation apparatus such as a printer that acquires image data from an external server and prints the acquired image data. This control is performed in the case where the image formation apparatus can not acquire the image data.

(2) Description of the Related Art

In recent years, image formation apparatuses such as copy machines capable of performing so called "direct printing" have been becoming common (see Japanese Laid-open Patent Application Publication No. 11-134125). The "Direct printing" is to directly analyze a document written in a markup language such as HTML (Hyper Text Markup Language), XHTML (Extensible Hyper Text Markup Language) and XML (Extensible Markup Language) received from a communication terminal such as a mobile telephone apparatus, acquire image data from an external server specified by URLs included in the document, and lay out and print the image data according to layout information of the document.

In order to perform such direct printing of the document written in a markup language, the image formation apparatuses are equipped with browser software. The image formation apparatuses execute browser software to analyze the document written in the markup language. Detecting a URL (Uniform Resource Locator) that shows a location of image data stored in an external server on a network, the image formation apparatuses acquire the image data from the server specified by the URL, and lay out and print the acquired image data according to layout information described in the document.

Thus, the communication terminal can easily get the image formation apparatuses to print out a document written in a markup language by simply transmitting such a document to the image formation apparatuses.

Such an image formation apparatus has to acquire the image data from an external server to perform the direct printing of a document written in a markup language. In some cases, however, the image formation apparatus can not acquire the image data from the server due to a bad connection with the server.

In such cases, if the image formation apparatus suspends the printing until receipt of the user's instruction, the image formation apparatus has to store the data for the printing all the while, and part of the memory area is occupied with the data. This disturbs efficient usage of the memory. Thus, conventional technologies cancel the printing without exception, or continue the printing without exception based on image data other than the data that the image formation apparatus can not acquire.

However, if the image formation apparatus cancels printing without exception when it can not acquire image data, the image formation apparatus might unnecessarily cancel the printing. This applies to, for example, the case where the image data that the image formation apparatus can not acquire is image data of advertisements which is unnecessary for the user. If this is the case, the image formation apparatus is required to restart the printing, and it takes an extra time to complete the printing.

On the other hand, in the case where the image formation apparatus continues the printing without exception based on image data other than the data that the image formation apparatus can not acquire, even if the information shown by the image data that the image formation apparatus can not acquire is important for the user, the image formation apparatus completes the printing without providing such important information on the sheet. This results in the waste of the sheet.

SUMMARY OF THE INVENTION

The present invention is made to solve the problem described above. The object of the present invention is to provide an image formation apparatus having a function of acquiring image data from the outside and executing printing, with which it is possible to control the execution of the printing in the case it fails to acquire the image data, to prevent that the printing is unnecessarily canceled or unnecessarily executed. The present invention also aims to provide a print control method for use by such an image formation apparatus.

To achieve the object above, one aspect of the present invention provides an image formation apparatus that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data respectively, and image layout information for the one or more pieces of image data, the image formation apparatus comprising: a reconstructor operable, by using browser software, to arrange the one or more pieces of text data included in the document data within a page of the document according to the text layout information, and attempt to acquire the one or more pieces of image data from relevant servers according to the identifiers and the locations of the one or more pieces of image data and arrange acquired pieces among the one or more pieces of image data within the page of the document according to the image layout information; a judgment part operable, in a case where the reconstructor has failed to acquire some of the one or more pieces of image data, to judge whether each of the some of the one or more pieces of image data is important or not according to a corresponding piece of the image data attribute information; and a controller operable to execute printing of the document reconstructed based on the one or more pieces of text data and/or the acquired pieces of image data if the judgment part judges negatively as to all of the some of the one or more pieces of image data that the reconstructor has failed to acquire, and to cancel the printing if the judgment part judges affirmatively as to any of the some of the one or more pieces of image data that the reconstructor has failed to acquire.

Another aspect of the present invention is an image formation method for use by an image formation apparatus that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data respectively, and image layout information for the one or more pieces of image data, the image formation method comprising: a reconstructor step of, by using browser software, arranging the one or more pieces of text data included in the document data within a page of the document according to the text layout information, and attempting to acquire the one or more pieces of image data from relevant servers according to the identifiers and the locations of the one or more pieces of image data and arranging acquired pieces among the one or more pieces of image data within the page of the document according to the image layout information; a judgment step of, in a case where the reconstructor has failed to acquire some of the one or more pieces of image data, judging whether each of the some of the one or more pieces of image data is important or not according to a corresponding piece of the image data attribute information; and a controller step of executing printing of the document reconstructed based on the one or more pieces of text data and/or the acquired pieces of image data if the judgment step judges negatively as to all of the some of the one or more pieces of image data that the reconstructor step has failed to acquire, and to cancel the printing if the judgment step judges affirmatively as to any of the some of the one or more pieces of image data that the reconstructor step has failed to acquire.

With the stated structures, in the case where the image formation apparatus fails to acquire a piece of image data, the image formation apparatus judges whether the piece of image data is important or not based on the image data attribute information. The image formation apparatus executes printing of the document excluding the piece of image data only when the piece of image data is judged as unimportant. The image formation apparatus can prevent that the printing is unnecessarily cancelled and unnecessarily executed. Thus, the image formation apparatus can appropriately execute the printing of the document reconstructed based on the document data written in the markup language.

Here, the image formation apparatus may further comprise a storage that prestores therein locations of one or more pieces of low-importance image data, wherein if a location of a piece of image data that the reconstructor or the reconstructor step has failed to acquire is identical to any one of the locations of the one or more pieces of low-importance image data, the judgment part or the judgment step may judge that the piece of image data that the reconstructor or the reconstructor step has failed to acquire is not important.

With the stated structure, it is possible to prestore the locations of unimportant pieces of image data if they are known. If the image formation apparatus fails to acquire a piece of image data at such a location, it can surely judge that the piece of image data is unimportant. Thus, it is possible to effectively prevent that the printing is unnecessarily cancelled due to the acquisition failure of the piece of image data.

Here, if the image layout information shows that a piece of image data that the reconstructor or the reconstructor step has failed to acquire is to be arranged in a peripheral area of the page of the document, the judgment part or the judgment step may judge that the piece of image data that the reconstructor or the reconstructor step has failed to acquire is not important.

With the stated structure, the piece of image data to be located in the peripheral area of the page of the document will be judged as unimportant. Thus, it is possible to effectively prevent that the printing is unnecessarily cancelled due to acquisition failure of an unimportant piece of image data such as advertisement images and instructions buttons which are expected to be printed in the peripheral area often.

Here, if the image layout information shows that a size of a piece of image data that the reconstructor or the reconstructor step has failed to acquire is smaller than a predetermined size, the judgment part or the judgment step may judge that the piece of image data that the reconstructor or the reconstructor step has failed to acquire is not important.

With the stated structure, a piece of image data whose size is smaller than the predetermined size will be judged as unimportant. Thus, it is possible to detect an advertisement image, which is often shown as a thumbnail in the page of the document, based on the size of the piece of image data, and to judge the piece of image data as unimportant. Thus, it is possible to effectively prevent that the printing is unnecessarily cancelled due to the acquisition failure of the piece of image data.

Here, if an identifier of a piece of image data that the reconstructor or the reconstructor step has failed to acquire shows that the piece of image data is a movie, the judgment part or the judgment step may judge that the piece of image data that the reconstructor or the reconstructor step has failed to acquire is not important With the stated structure, in the case where the piece of image data that the image formation apparatus has failed to acquire is a movie, the image formation apparatus judges that the piece of image data is not important. Thus, in the case of the acquisition failure of a movie, which the user rarely intends to print it mainly, it is possible to effectively prevent that the printing is unnecessarily cancelled due to the acquisition failure of such a movie.

Here, the judgement part or the judgment step may judge, for each piece of image data that the reconstructor or the reconstructor step has failed to acquire, whether or not a proportion of a count of locations that are identical with a location of the piece of the image data that the reconstructor or the reconstructor step has failed to acquire is smaller than a predetermined proportion with respect to a total count of the locations of the one or more pieces of image data included in the document data, and if judged affirmatively, judge that the piece of image data that the reconstructor or the reconstructor step has failed to acquire is not important.

With the stated structure, in the case where a proportion of a count of locations that are identical with a location of the piece of the image data that the reconstructor has failed to acquire is smaller than a predetermined proportion with respect to a total count of the locations of the image data included in the document data, the piece of image data will be judged as unimportant. It is not often that a plurality of advertisement images of an identical advertiser are displayed in a single document page. Thus, it is possible to detect such images according to the above-mentioned proportion, and to judge that they are unimportant. It is therefore possible to effectively prevent that the printing is unnecessarily cancelled due to the acquisition failure of such unimportant images.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 3 is a specific example of document data written in a markup language;

DESCRIPTION OF THE PREFERRED EMBODIMENT

The following describes preferred embodiments of an image formation apparatus pertaining to the present invention, based on examples, namely a printer 100 and a printer 200.

First Embodiment

<Structure>
(1) The Network Configuration

Figure 1:
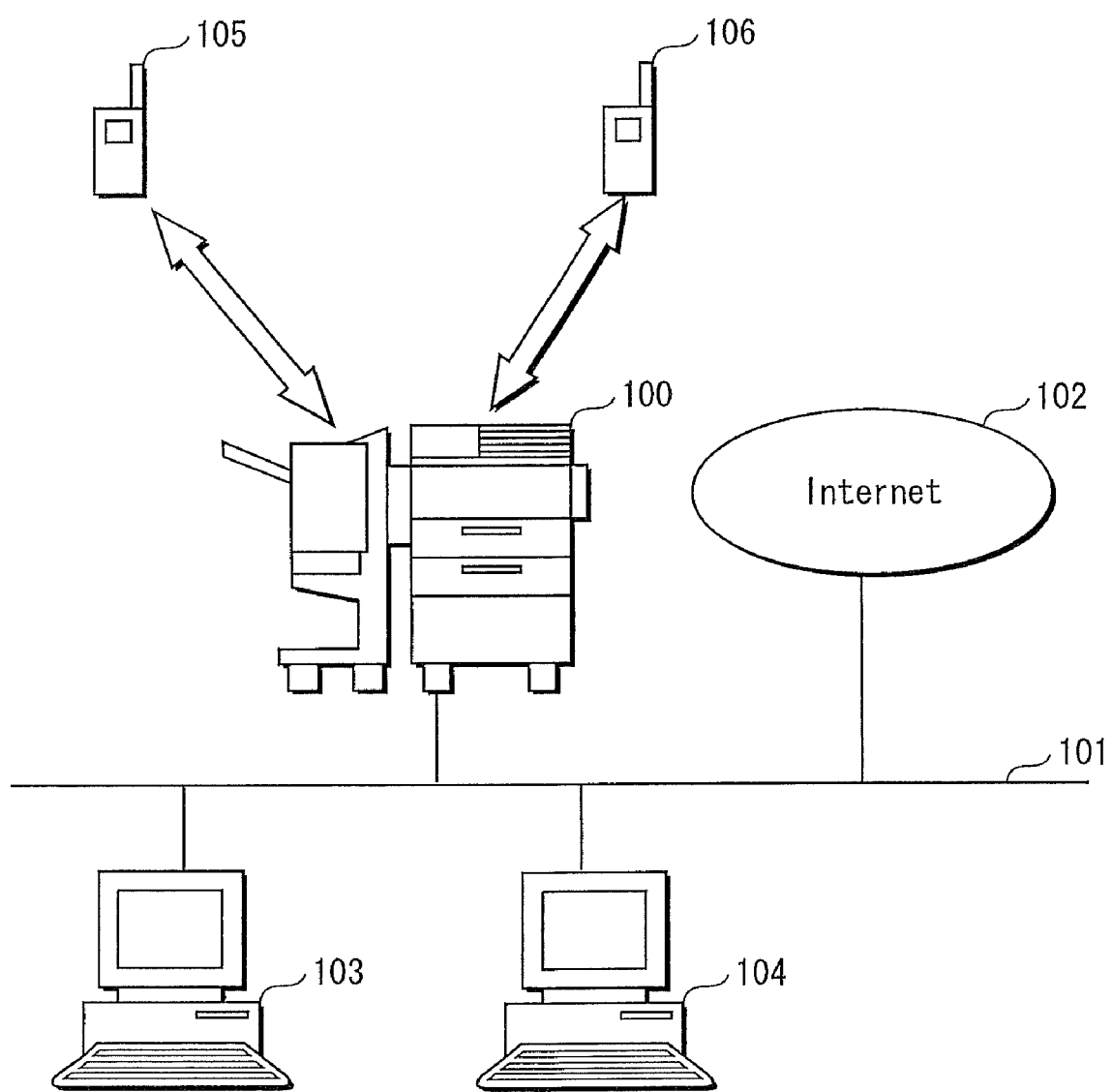
FIG. 1 shows an example configuration of a network with which a printer 100 is connected.

FIG. 1 shows an example configuration of a network with which a printer 100 pertaining to the present invention is connected.

As FIG. 1 shows, the printer 100 is connected with personal computers (hereinafter called "PCs") 103 and 104 via a LAN (Local Area Network) 101, and with mobile communication terminals (e.g. mobile telephone apparatuses) 105 and 106 by wireless connections (e.g. connections by Bluetooth™, which is a near field communication technology).

The LAN 101 is connected with an Internet network 102. The PCs 103 and 104 are connected to an external server (not illustrated) via the Internet network 102. From the external server, the PCs 103 and 104 acquire document data written in a markup language such as HTML (Hyper Text Markup Language), XHTML (Extensible Hyper Text Markup Language) and XML (Extensible Markup Language) (such a document data is hereinafter called "markup description document data"), transmit the acquired markup description document data to the printer 100 via the LAN 101.

The mobile communication terminals 105 and 106 connect to the external server via a wireless or a wired communication network (not illustrated) and the Internet network 102, acquire the markup description document data from the external server, and transmit the acquired data to the printer 100.

Via the Internet network 102, the printer 100 connects to servers specified by URLs included in the markup description document data received from the PCs 103 and 104 and the mobile communication terminals 105 and 106 respectively, and acquire image data for printing from the connected servers.

Note that the printer 200, which is described in a later section, is also connected to the above-described networks.

(2) The Structure of the Printer 100

Figure 2:
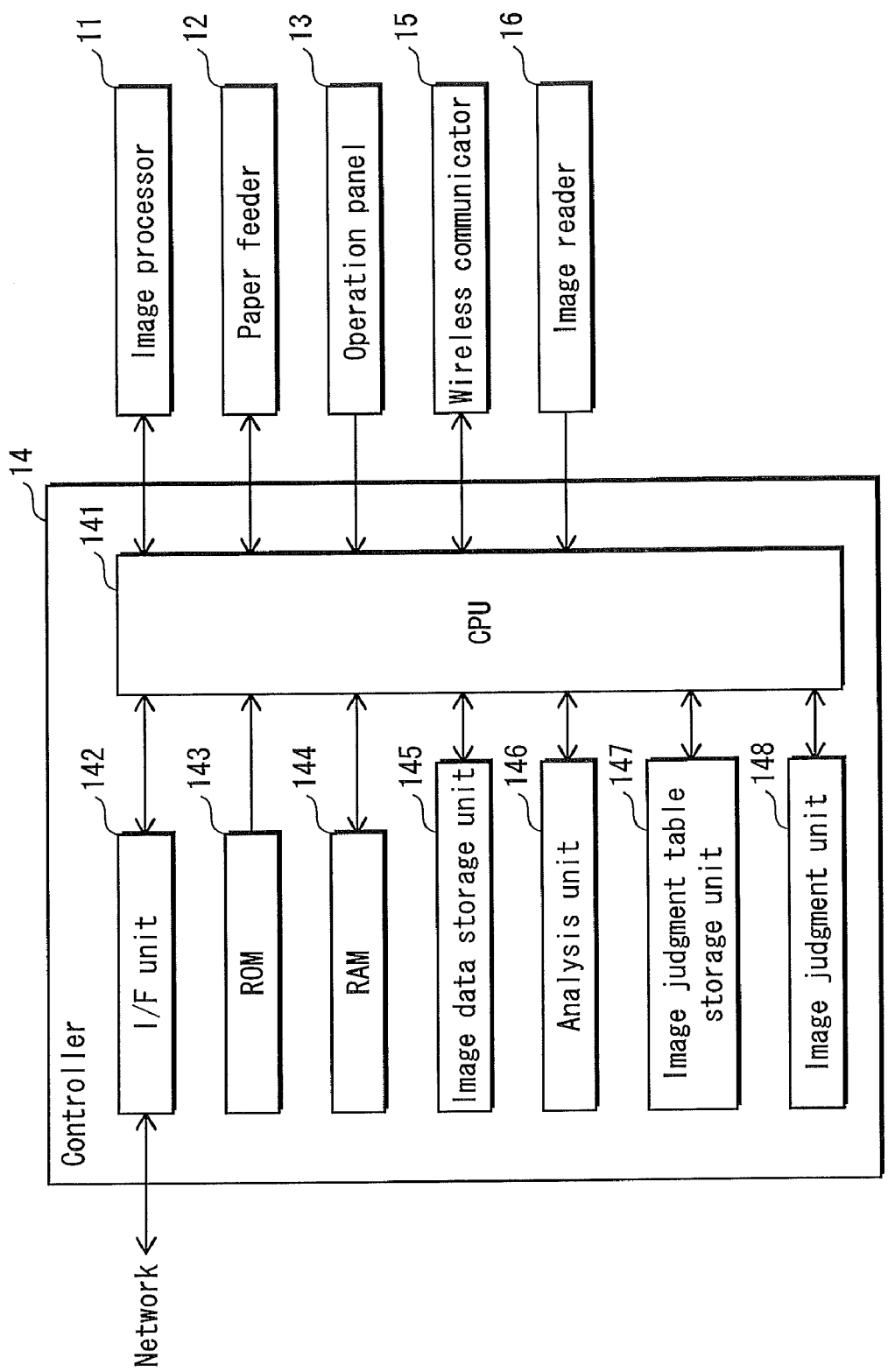
FIG. 2 is a functional block diagram showing the structure of the printer 100.

FIG. 2 is a functional block diagram showing the structure of the printer 100. As FIG. 2 shows, the printer 100 includes an image processor 11, a paper feeder 12, an operation panel 13, a controller 14, a wireless communicator 15, and an image reader 16.

The image processor 11 executes printing by forming an image on a recording sheet provided by the paper feeder 12, based on image data for the printing input from the controller 14 or the image reader 16.

The operation panel 13 includes input keys and an LCD display. A touch panel is layered on the surface of the LCD display. The control panel 13 receives user's instructions input from the touch panel or from the input keys, and notifies the controller 14 of the instructions.

The wireless communicator 15 is an interface for a near field communication (e.g. wireless communication by Bluetooth™) with the mobile communication terminals 105 and 106. The wireless communicator 15 includes an antenna for receiving radio waves from the mobile communication terminals 105 and 106.

Here, the "Bluetooth" is a frequency diffusion wireless communication system that uses a 2.4 GHz ISM (Industrial Scientific Medical) band.

The image reader 16 is structured from an image input device such as a scanner. The image reader 16 reads information such as characters and figures on a recording sheet, and forms image data for printing.

The controller 14 mainly includes a CPU 141, a communication interface (I/F) unit 142, a ROM 143, a RAM 144, an image data storage unit 145, an analysis unit 146, an image judgment table storage unit 147, and an image judgment unit 148.

The I/F unit 142 is an interface for connection to the LAN, such as a LAN card and a LAN board.

The ROM 143 stores therein a program necessary for execution of the image formation operations, browser software for analysis of the markup description document data, a program for execution of the print control operations, threshold values for use in each control operation, and so on.

The RAM 144 is for use as a work area for the CPU 141 when the CPU 141 executes a program.

The image data storage unit 145 stores therein image data for printing received via the I/F unit 142 and the image reader 16.

The analysis unit 146 analyzes the markup description document data received from the I/F unit 142 or the wireless communicator 15, and extracts text data to be printed from the document. In the case a location of image data to be printed is indicated in the document, the analysis unit 146 connects to the external server which stores the image data via the I/F unit 142 according to the location, and acquires the image data from the server. The analysis unit 146 generates image data for printing, by arranging the extracted text data and the acquired image data in the form of a page, according to layout condition designated for each piece of data. The analysis unit 146 stores the generated image data in the image data storage unit 145 through operations by the CPU 141.

The above-described functions of the analysis unit 146 can be realized through execution of the browser software.

FIG. 3 is a specific example of document data written in a markup language.

In FIG. 3, the part between the tag (<style type="text/css">) indicated with the sign 301 and the tag (</style>) indicated with the sign 304 describes layout conditions for the text data and the image data in the document. Specifically, this part includes descriptions of the sizes of the margins on the left, right, top and bottom of the sheet, the image size, the font size, the height of the lines of characters, and so on.

The sign 302 shows layout conditions for the text data "sample1". The sign 303 shows layout conditions for the image data "sample2".

The part between the tag (<body>) indicated with the sign 305 and the tag (</body>) indicated with the sign 308 describes text data and an URL (Uniform Resource Locator) that shows the location of image data.

The sign 306 indicates descriptions of the text data, and the sign 307 indicates descriptions relating to the URL (Uniform Resource Locator) that shows the location of the image data.

The image judgment table storage unit 147 stores therein a low-importance URL list and a threshold value K for a peripheral print area.

Here, the "low-importance URL list" is a list of URLs that indicate locations of pieces of image data that do not cause any major problems for the user even if they would not be printed. An example of such image data is advertisement contents. The URLs to be included in the low-importance URL list are registered beforehand with the image judgment table storage unit 147 by the user or the manufacturer of the printer 100.

Figures 4, 5:
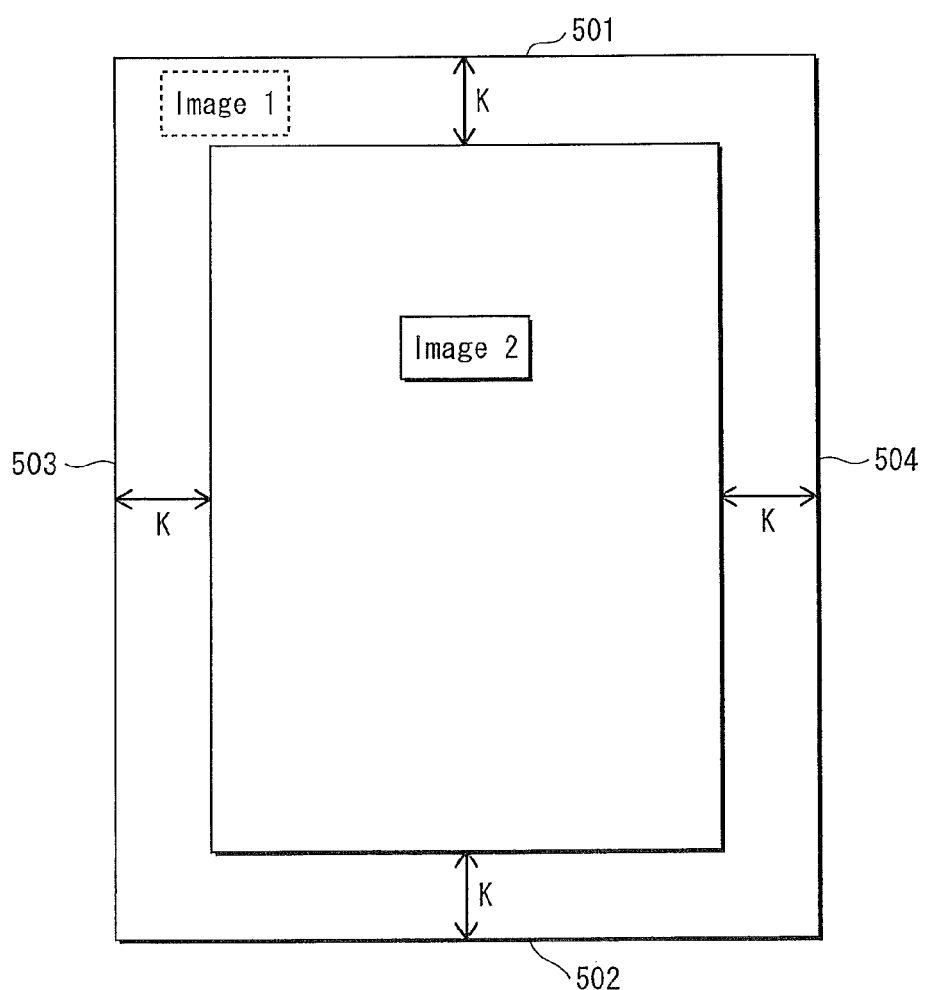
FIG. 4 shows a specific example of a low-importance URL list stored in an image judgment table storage unit 147.
FIG. 5 explains a relationship between a peripheral print area and a threshold value K.

FIG. 4 shows a specific example of the low-importance URL list stored in the image judgment table storage unit 147.

The "peripheral print area" is an area that is a predetermined distance away from the left, right, top and bottom lines of the frame of the page indicated by the markup description document data. FIG. 5 specifically shows the peripheral print area. The distance from the top line of the page frame indicated with the sign 501, the distance from the bottom line of the page frame indicated with the sign 502, the distance from the left line of the page frame indicated with the sign 503, and the distance from the right line of the page frame indicated with the sign 504 are all not more than a threshold value K. The image judgment table storage unit 147 stores therein this threshold value K.

The reason for determining the threshold K for the peripheral pint area is that it is possible to estimate whether the image data described in the markup description document data is important or not based on whether the print area of the image data is within the peripheral print area or not. This is because unimportant image data that does not cause any major problems for the user even if it would not be printed, such as advertisements and operation buttons, is often printed in the peripheral area of the page.

Note that the threshold value K can be determined based on, for example, the standard sizes of image data for online advertisements, defined by the IAB (Interactive Advertising Bureau). The IAB is an industry group for online advertisements.

For example, the IAB stipulates five image data sizes for rectangular-type online advertisements (i.e. width 300 pixels×height 250 pixels, width 250 pixels×height 250 pixels, width 240 pixels×height 400 pixels, width 336 pixels×height 280 pixels, and width 180 pixels×height 150 pixels). The threshold value K can be determined based on the maximum size 400 pixels among the width sizes and the height sizes above, and the margin size. For example, the threshold value K may be 450 pixels.

It is also acceptable that a different threshold value is determined for each of the width-direction size and the height direction size (For example, the width-direction threshold value may be the maximum width size 336 pixels of the advertisement image data and the height-direction threshold value may be 400 pixels. Also, a value (e.g. 50 pixels) determined based on the margin size may be added to each size).

The image judgment unit 148 judges whether the image data is important or not in the case the printer 100 has failed to acquire the image data from the link destination described in the markup description document data. The image judgment unit 148 makes this judgment based on the descriptions relating to the image data, which are included in the markup description document data.

Specifically, the image judgment unit 148 judges whether the image data is important or not based on whether the URL showing the location of the image data is included in the low-importance URL list, or whether the print area of the image data is within the peripheral print area or not.

Here, the print area of the image data is specified based on the margin size and the image size included in the layout conditions relating to the image data, which are described in the markup description document.

More specifically, the width size of the print area of the image data is specified as the width size of the margin (measured from the right edge or the left edge of the page frame) plus the width size of the image data, and the height size of the print area of the image data is specified as the height size of the margin (measured from the top edge or the bottom edge of the page frame) plus the height size of the image data.

For example, in the case of the layout conditions for the "sample2" that is indicated with the sign 303 in FIG. 3, the height size of the margin (measured from the top edge of the page frame) is 100 pixels as "top 100px" shows, and the height size of the image data is 50 pixels as "height: 50px" shows. Thus, the height size of the print area is of the image data is 150 pixels. The width size of the margin (measured from the left edge of the page frame) is 50 pixels as "left 50px" shows, and the width size of the image data is 50 pixels as "width: 50px" shows. Thus, the width size of the print area of the image data is 100 pixels.

In the case at least one of the width size and the height size of the print area is not greater than the threshold value K (e.g. the case of the image 1 in FIG. 5), the image judgment unit 148 judges that the print area of the image data is included within the peripheral print area, and that the image data is not important.

On the other hand, in the case both of the width size and the height size of the print area is greater than the threshold value K (e.g. the case of the image 2 in FIG. 5), the image judgment unit 148 judges that the print area of the image data is not included within the peripheral print area, and that the image data is important.

The CPU 141 reads a necessary control program from the ROM 143, and controls the image processor 11, the paper feeder 12, the image reader 16 and so on, in order to smoothly execute the image formation operations. Also, the CPU 141 judges whether or not to print the page indicated by the markup description document data in the case where it has failed to acquire the image data from the external server, and controls the execution of the image formation operations based on the result of the judgment.

<Operations>

Figure 6:
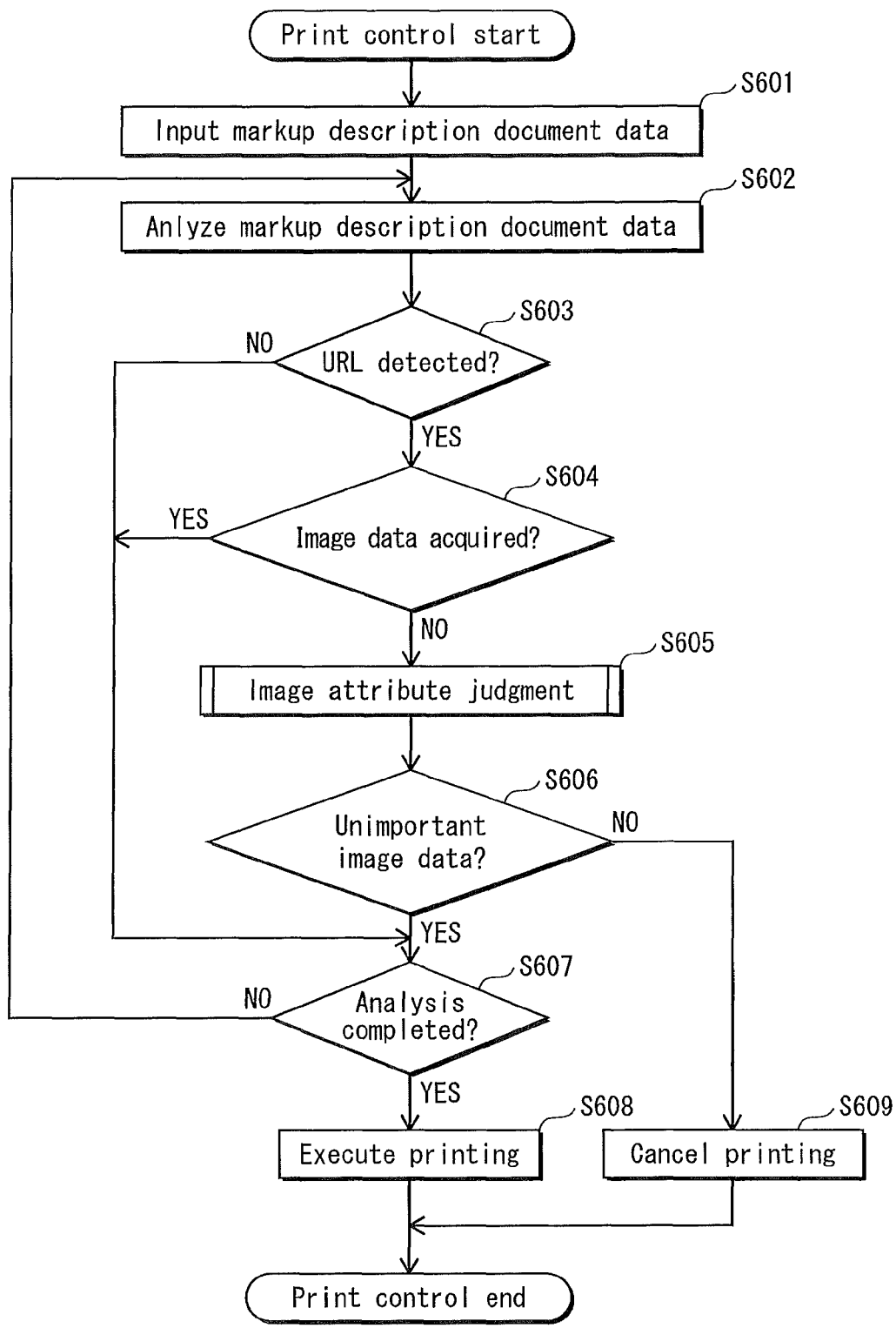
FIG. 6 is a flowchart showing operations for print control performed by a controller 14.

The following explains the operations for the print control performed by the controller 14. FIG. 6 is a flowchart showing the operations.

On receipt of markup description document data from the I/F unit 142 or the wireless communicator 15 (Step S601), the controller 14 analyzes the markup description document data through operations by the analysis unit 146 (Step S602). If a URL showing the location of image data is has detected (Step S603: YES), the controller 14 attempts to connect to the external server that stores the image data according to the URL for a predetermined period, through operations by the I/F unit 142.

Here, the period is determined appropriately in advance by the manufacturer, depending on the communication capability of the printer 100.

If the controller 14 is unable to connect to the external server within the predetermined period and fails to acquire the image data (Step S604: No), the controller 14 performs image attribute judgment, which is described in a later section, through operations by the image judgment unit 148 (Step S605) to judge whether the image data is unimportant or not (Step S606). If the image data is important (Step S606: NO), the controller 14 cancels the execution of the printing of the page indicated by the markup description document data (Step S609).

If no URL has been detected in Step S603 (Step S603: NO), or the image data has been acquired in Step S604 (Step S604: YES), or the image data is judged as not important in Step S606 (Step S606: YES), after completion of the analysis of the markup description document data (Step S607: YES), the controller 14 causes the image processor 11 to execute the printing of the page indicated by the markup description document data (Step S608).

In the case where the controller 14 has failed to acquire any pieces of image data, the controller 14 causes the image processor 11 to execute the printing of the page except for the pieces of image data that the controller 14 has failed to acquire.

Figure 7:
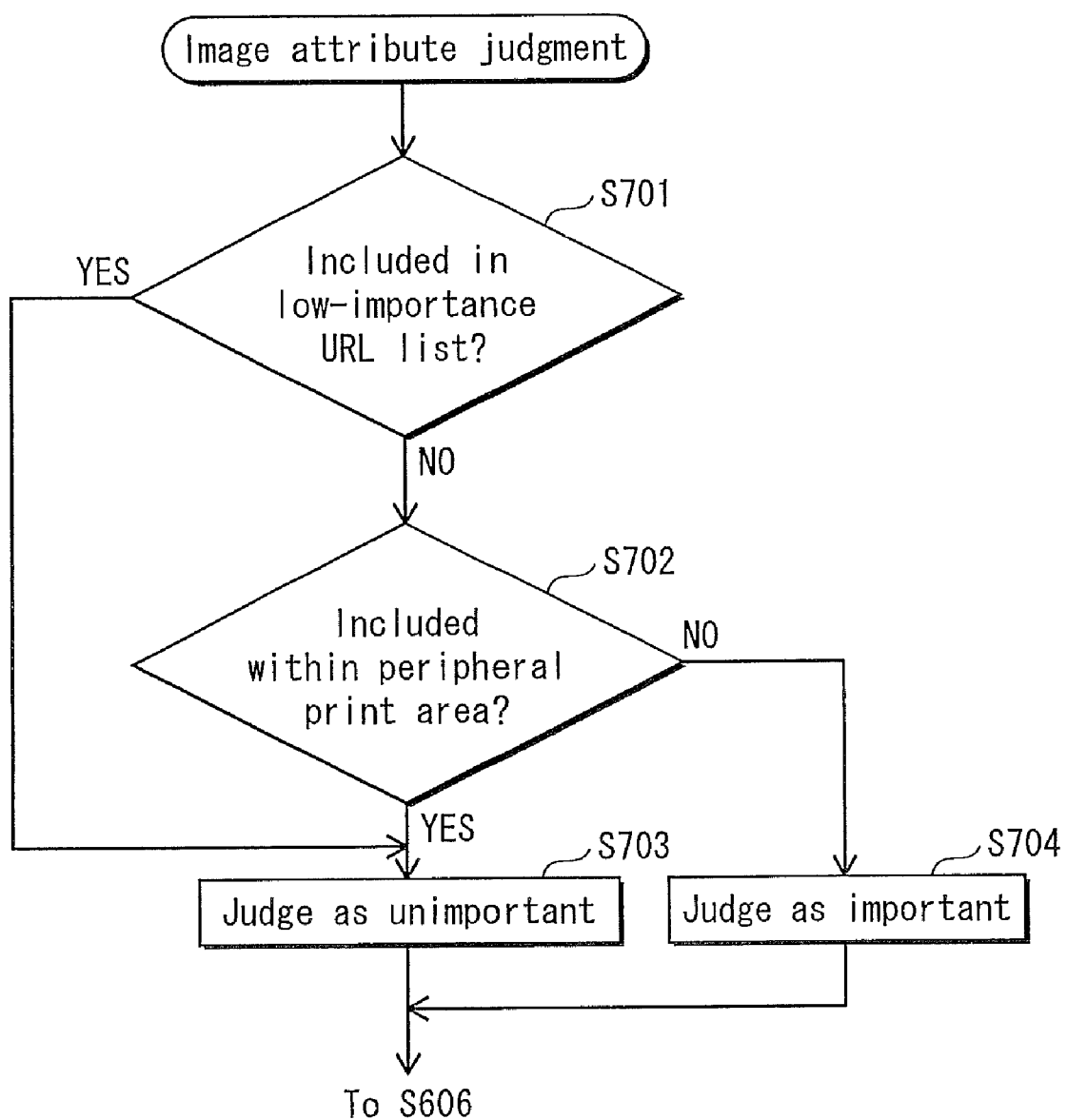
FIG. 7 is a flowchart showing operations for image attribute judgment performed by an image judgment unit 148.

Next, the following explains operations for the image attribute judgment performed by the image judgment unit 148. FIG. 7 is a flowchart showing the operations.

The image judgment unit 148 acquires the URL of the piece of image data that the controller 14 has failed to acquire and the analysis result relating to the layout conditions of the piece of image data, from the analysis unit 146. The image judgment unit 148 judges whether the URL is included in the low-importance URL list stored in the image judgment table storage unit 147 and whether the print area of the piece of image data, indicated by the layout conditions, is included within the peripheral print area (Step S701, Step S702).

If the URL is included in the low-importance URL list (Step S701: YES), or the print area of the piece of image data, indicated by the layout conditions, is included within the peripheral print area (Step S702: YES), the image judgment unit 148 judges that the piece of image data is not important (Step S703). If the URL is not included in the low-importance URL list (Step S701: NO) and the print area of the piece of image data is not included within the peripheral print area (Step S702: NO), the image judgment unit 148 judges that the piece of image data is important (Step S704).

Second Embodiment

According to the first embodiment, in the case where the controller 14 has failed to acquire any piece of image data from the server specified by the URL described in the markup description document data, the image judgment unit 148 judges whether the image data is unimportant or not based on whether the URL is included in the low-importance URL list, or whether the print area of the image data is included within the peripheral print area. The second embodiment is different from the first embodiment in that the image judgment unit 148 judges whether the image data is unimportant or not based on the occurrence frequency of the domain name included in the URL in the markup description document data.

The following mainly explains the difference.

<Structure>

Figure 8:
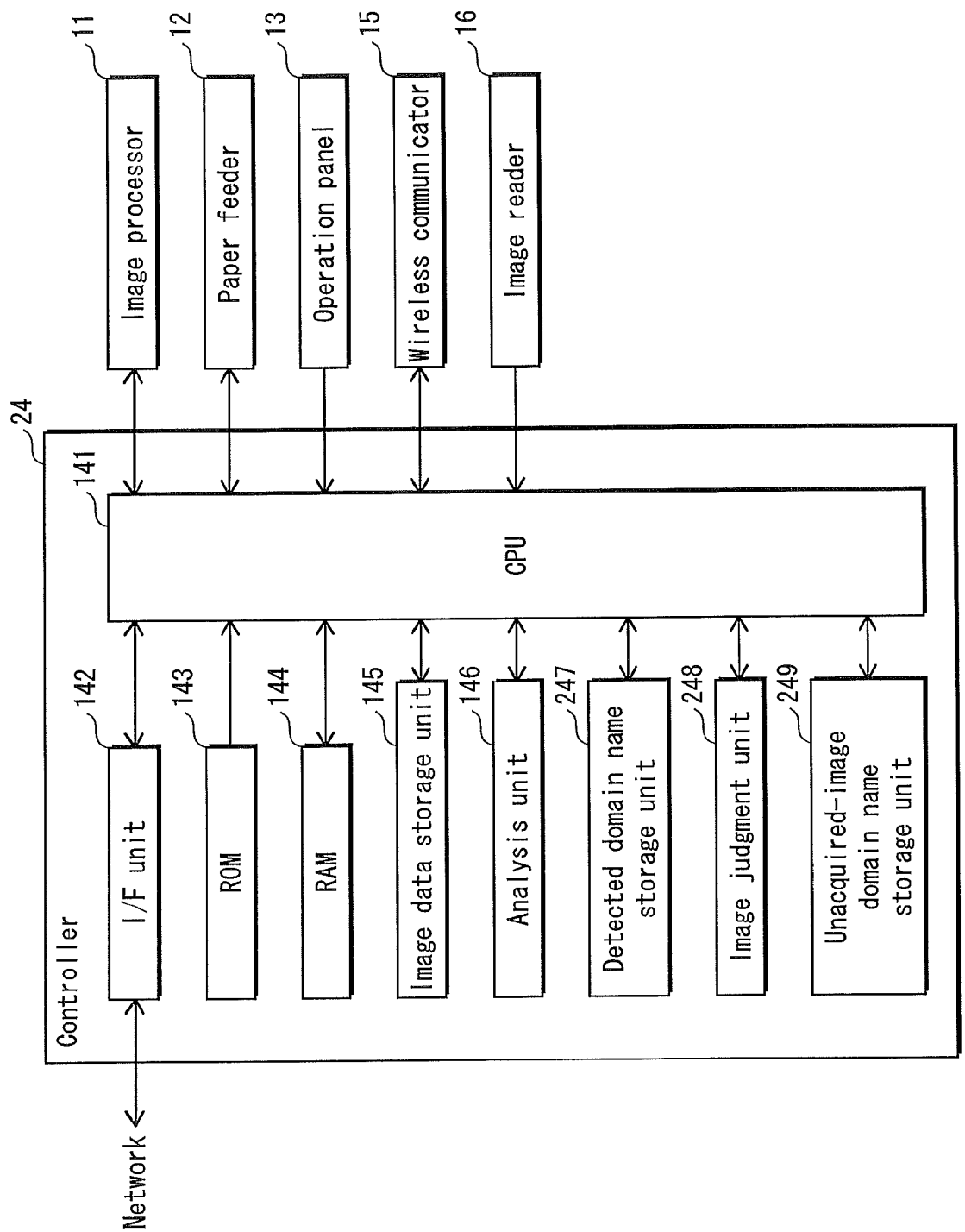
FIG. 8 is a functional block diagram showing the structure of a printer 200.

FIG. 8 is a functional block diagram showing the structure of a printer 200 pertaining to the second embodiment. As FIG. 8 shows, the printer 200 includes an image processor 11, a paper feeder 12, an operation panel 13, a controller 24, a wireless communicator 15, and an image reader 16.

Since the components other than the controller 24 are the same as those included in the printer 100 of the first embodiment and are explained above, only the controller 24 is explained next.

The controller 24 mainly includes a CPU 141, a communication interface (I/F) unit 142, a ROM 143, a RAM 144, an image data storage unit 145, an analysis unit 146, a detected domain name storage unit 247, an image judgment unit 248 and an unacquired-image domain name storage unit 249, and so on.

The following only explains the components different from those included in the controller 14.

Every time the analysis unit 146 detects an URL in the markup description document data, the detected domain name storage unit 247 stores therein the domain name included in the detected URL.

For each of the domain names stored in the unacquired-image domain name storage unit 249, the image judgment unit 248 detects the identical domain names from the domain name storage unit 247, and counts the number of the identical domain names. If the proportion (e.g. percentage) of the counted number to the total number of the domain names stored in the domain name storage unit 247 is smaller than a threshold value, the image judgment unit 248 judges that the image data relating to the domain name is not important. If the proportion is not smaller than the threshold value, the image judgment unit 248 judges that the image data relating to the domain name is important.

The unacquired-image domain name storage unit 249 stores therein the domain name of a domain from which the controller 24 has failed to acquire the image data.

<Operations>

Figure 9:
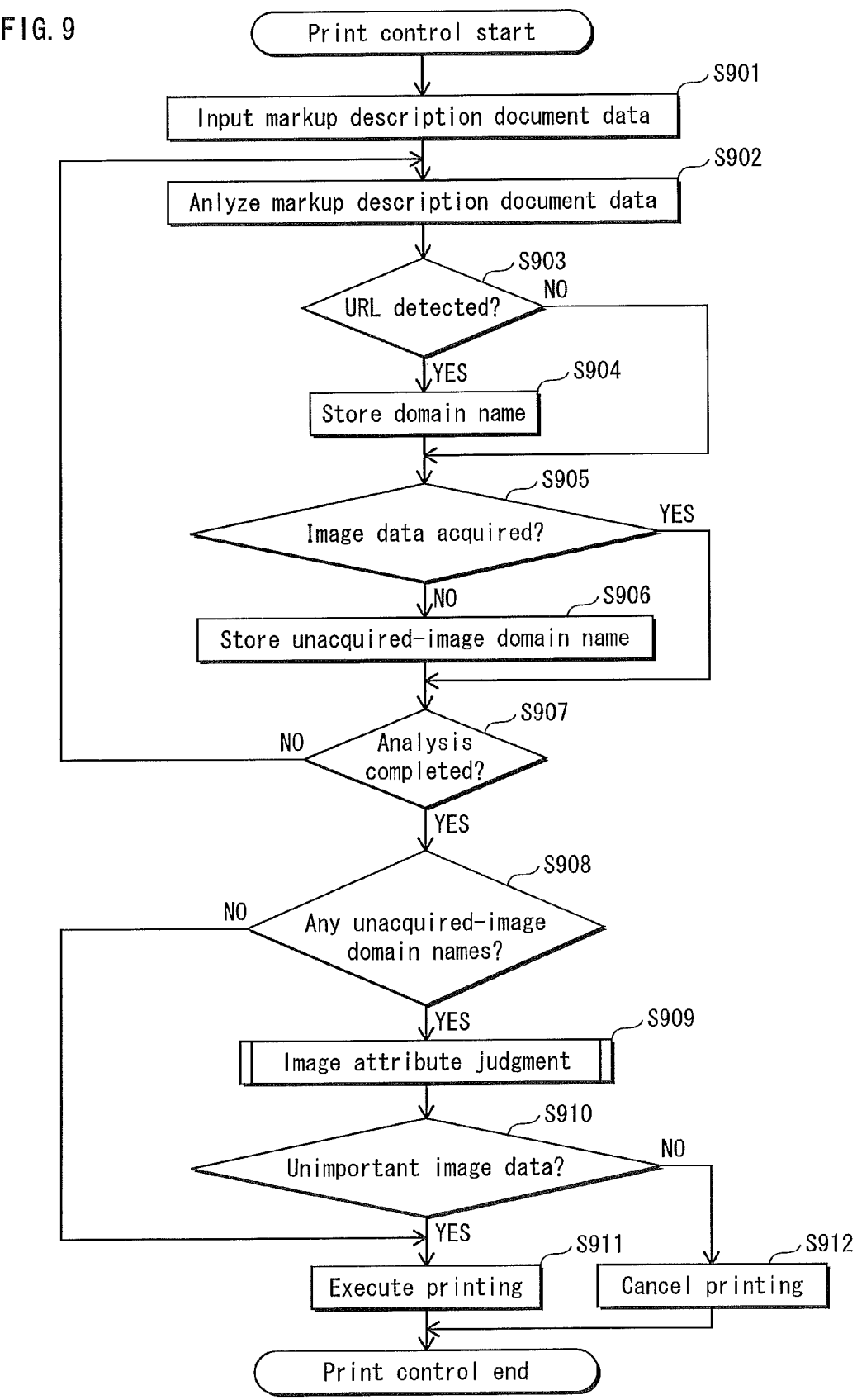
FIG. 9 is a flowchart showing operations for print control performed by a control unit 24.

The following explains the operations for the printing performed by the controller 24. FIG. 9 is a flowchart showing the operations.

On receipt of markup description document data from the I/F unit 142 or the wireless communicator 15 (Step S901), the controller 24 analyzes the markup description document data through operations by the analysis unit 146 (Step S902). Every time the controller 24 detects an URL indicating the location of image data (Step S903: YES), the controller 24 attempts to connect to the external server that stores the image data according to the URL for a predetermined period, through operations by the I/F unit 142. Meanwhile, the controller 24 also extracts a domain name from the detected URL and stores the domain name in the detected domain name storage unit 247 (Step S904). The controller 24 attempts to connect to the external server that stores the image data according to the URL for a predetermined period, through operations by the I/F unit 142. If the controller 24 is unable to connect to the external server within the predetermined period and fails to acquire the image data (Step S905: No), the controller 24 stores the domain name of the URL relating to the image data, as an unacquired-image domain name, into the unacquired-image domain name storage unit 249 (Step S906).

Next, after completion of the analysis of the markup description document data (Step S907: YES), the controller 24 refers to the unacquired-image domain name storage unit 249. If any domain names are stored in the unacquired-image domain name storage unit 249 (Step S908: YES), the controller 24 performs the image attribute judgment through operations by the image judgment unit 248 (Step S909) to judge whether the image data is important or not as to each of the domain names (Step S910). If the image data is judged as important as to any of the domain names (Step S910: NO), the controller 24 cancels the execution of the printing of the page indicated by the markup description document data (Step S912).

If no domain name is stored in the unacquired-image domain name storage unit 249 (Step S908: NO), or the image data is judged as not important as to all the domain names in Step S910 (Step S910: YES), the controller 24 causes the image processor 11 to execute the printing of the page indicated by the markup description document data (Step S911).

In the case where the controller 24 has failed to acquire any pieces of image data, the controller 24 causes the image processor 11 to execute the printing of the page except for the pieces of image data that the controller 24 has failed to acquire.

Figure 10:
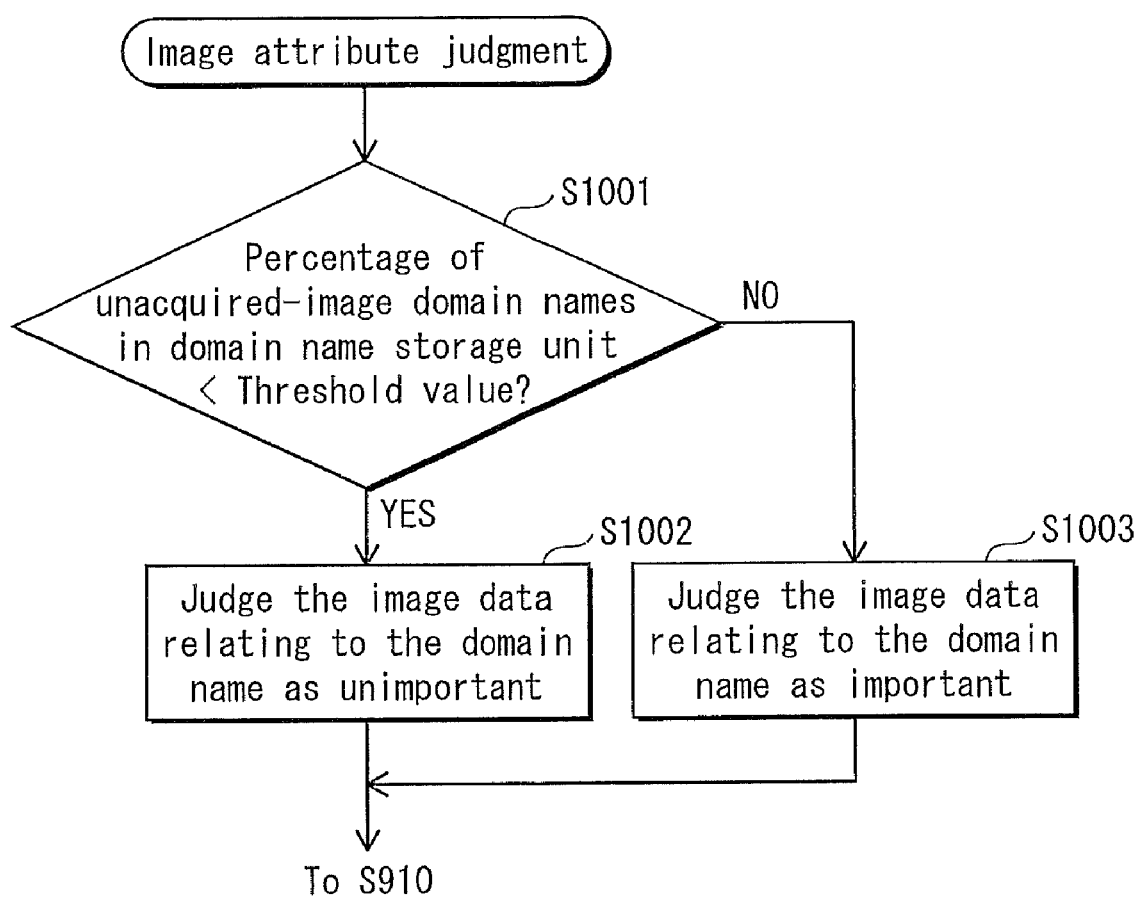
FIG. 10 is a flowchart showing operations for image attribute judgment performed by an image judgment unit 248.

Next, the following explains the operations for the image attribute judgment performed by the image judgment unit 248. FIG. 10 is a flowchart showing the operations.

For each of the domain names stored in the unacquired-image domain name storage unit 249, the image judgment unit 248 detects the identical domain names from the domain name storage unit 247, and counts the number of the identical domain names. If the percentage (%) of the counted number to the total number of the domain names stored in the domain name storage unit 247 is smaller than a threshold value (Step S1001: YES), the image judgment unit 248 judges that the image data relating to the domain name is not important (Step S1002). If the proportion is not smaller than the threshold value (Step S1001: NO), the image judgment unit 248 judges that the image data relating to the domain name is important (Step S1003).

Presumably, it is not often that a plurality of advertisement images based on image data of an identical advertiser are displayed in a page indicated by a single mark up description document data. Thus, it is possible to estimate whether the piece of image data that the controller 24 has failed to acquire is important or not based on whether the percentage mentioned above is smaller than the threshold value or not.

Regarding the threshold value, the manufacturer may calculate in advance, for a certain number of pieces of markup description document data, the percentage of the number of domain names that are the same as the domain name relating to unimportant image data, such as image data for advertisements, to the total number of the domain names included in the markup description document data, and use the average of the percentages as the threshold value.

<Supplemental Explanations>

The image formation apparatus pertaining to the present invention is explained above based on the embodiments. However, the present invention is not limited to the embodiments, as a matter of course.

(1) In the first embodiment, the image judgment unit 148 performs the image attribute judgment to judge whether the piece of image data that the controller 14 has failed to acquire is important or not based on whether the URL of the piece of image data is included in the low-importance URL list and on whether the print area of the piece of image data is included within the peripheral print area. However, the image judgment unit 148 may judge whether the piece of image data is important or not based on the image size of the piece of image data indicated by the layout conditions of the piece image data, described in the markup description document data.

Also, this method may be combined with the image attribute judgment of the first embodiment.

Figure 11:
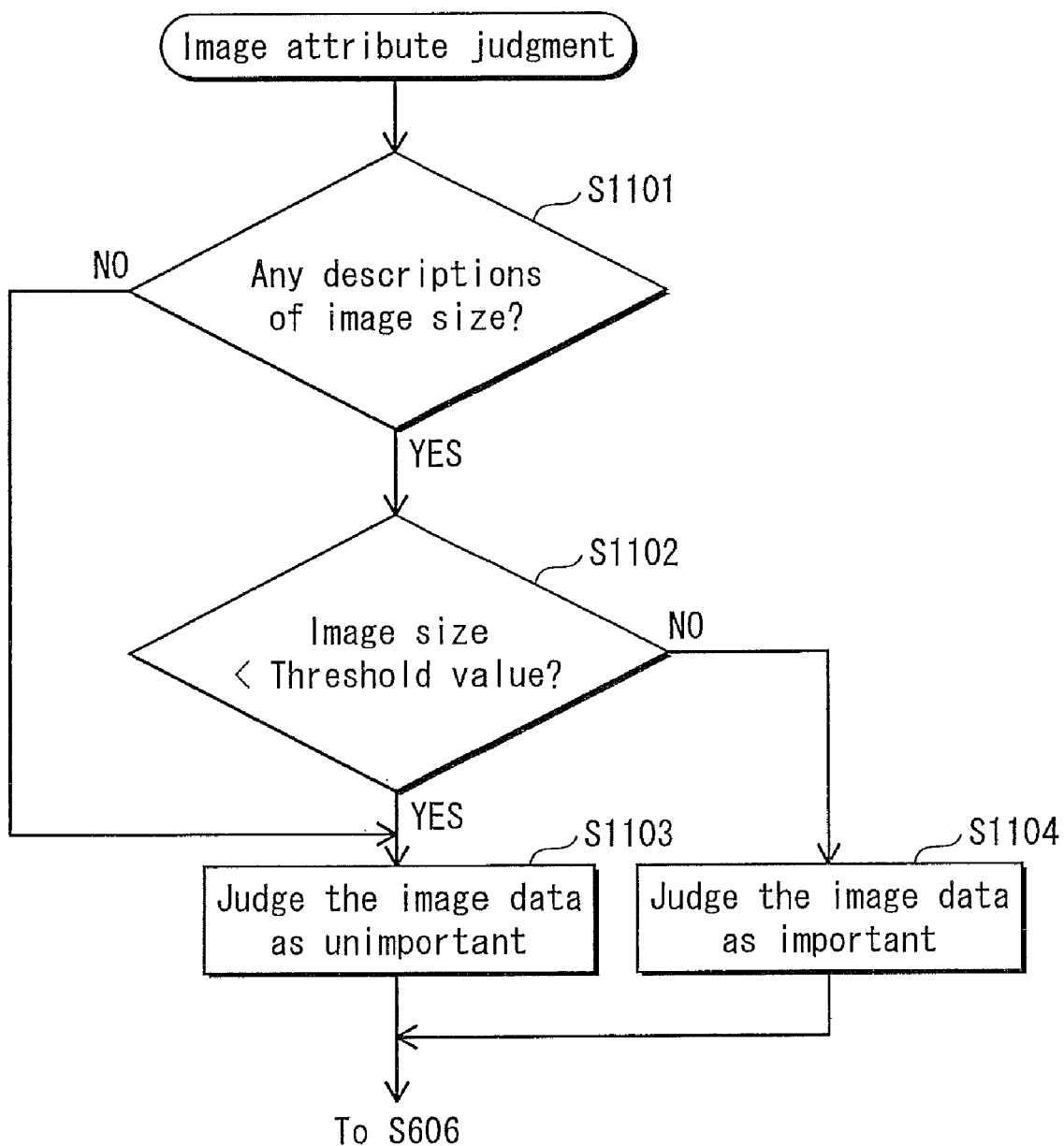
FIG. 11 is a modification example of the flowchart showing operations for the image attribute judgment performed by the image judgment unit 148.

Specifically, as FIG. 11 shows, in the case the image size of the piece of image data that the controller 14 has failed to acquire is described as a layout condition in the markup description document data that is input at Step S601 of FIG. 6 (Step S1101: YES), the image judgment unit 148 may judge whether or not the image size is smaller than a predetermined size (Step S1102). If the image size is smaller than the predetermined size (Step S1102: YES), the image judgment unit 148 judges that the piece of image data is not important (Step S1103). If the image size is not smaller than the predetermined size (Step S1102: NO), the image judgment unit 148 judges that piece of image data is important (Step S1104).

As the predetermined size, it is possible to use the size of "88 pixels×31 pixels" which is commonly used as the size of the image data for advertisements on web pages. Alternatively, the height size (e.g. 60 pixels) may be used as the predetermined size for the judgment, because the height size is usually smaller in the case of long and thin images such as banner advertisements.

With this structure, it is possible to estimate whether the piece of image data that the controller 14 has failed to acquire is of an advertisement that is not important, and to use the result of this judgment for judging whether the piece of image data is unimportant or not.

(2) Further, in addition to, or instead of the image attribute judgment of the first embodiment and (1), it is possible to judge whether the piece of image data that the controller 14 has failed to acquire is unimportant or not based on whether the file type of the piece of image data.

Figure 12:
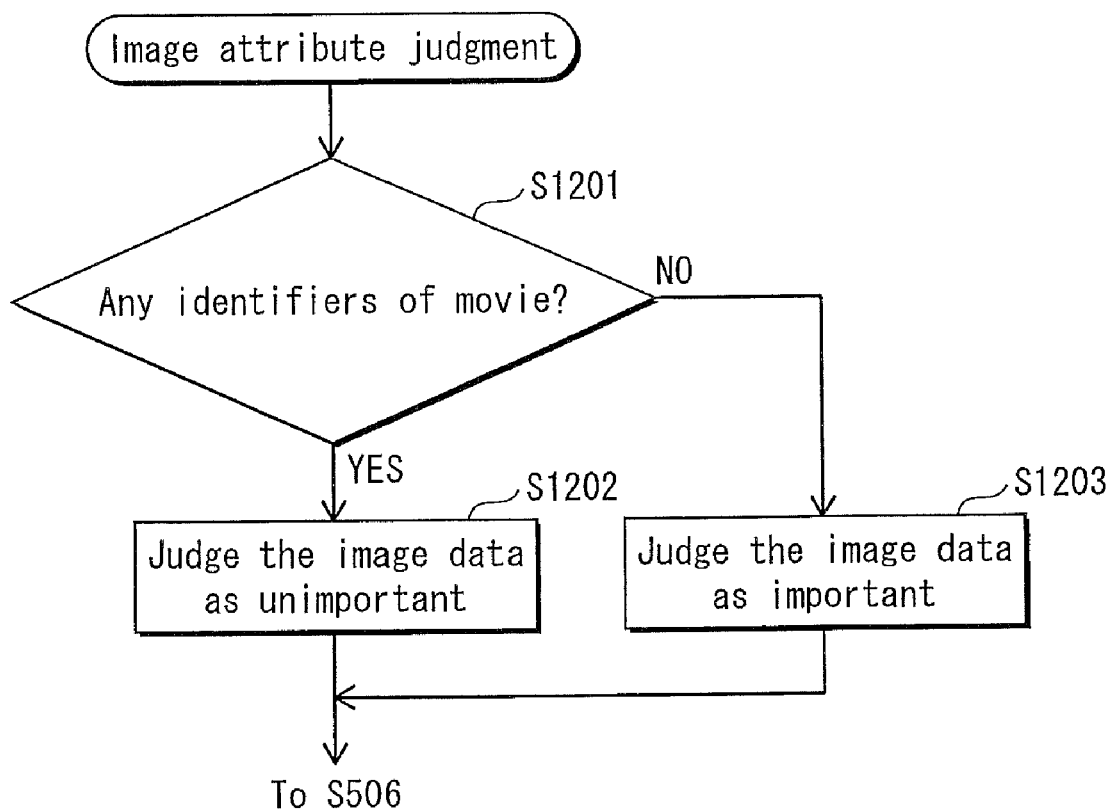
FIG. 12 is a modification example of the flowchart showing operations for the image attribute judgment performed by the image judgment unit 148.

Specifically, as FIG. 12 shows, the image judgment unit 148 acquires, from the analysis unit 146, the URL of the piece of image data which the controller 14 has failed to acquire, and judges whether the URL include an identifier of a movie (Step S1201). If the URL includes such an identifier (Step S1201: YES), the image judgment unit 148 judges that the piece of image data is not important (Step S1202). If the URL does not include such an identifier (Step S1201: NO), the image judgment unit 148 judges that the piece of image data is important (Step S1203)

Identifies of movies include, for example, "gif" and "swf", which indicate movie files used for animated advertisements.

With this structure, in the same manner as in (1), it is possible to estimate whether the piece of image data that the controller 14 has failed to acquire is of an advertisement that is not important based on the identifier, and to use the result of this judgment for judging whether the piece of image data is unimportant or not.

In Step S1201, in the case the URL includes an identifier of a movie (Step S1201: YES), the image judgment unit 148 may further perform the Step S702 of FIG. 7 for judgment of the print area. In the case the print area is included within the peripheral print area (Step S702: YES), the image judgment unit 148 may judge that the piece of image data is not important, as Step S1202 shows.

With the stated structure, it is possible to more precisely judge whether "the piece of image data that the control unit 14 has failed to acquire is image data of an advertisement that is not important".

(3) In the modification explained in (1) above, the image attribute judgment is performed based on the sizes of the images. Alternatively, the image attribute judgment may be performed based on whether the proportion (e.g. percentage) of the images in the page with respect to the sizes is smaller than a predetermined value or not. As the size of the page, the number of pixels equivalent to the paper size for use in the printing may be used.

Also, instead of judging whether or not the image size is smaller than a predetermined size (Step S1102), the image judgment unit 148 may judge whether or not the image size is equivalent to a predetermined size (e.g. one or more of standard sizes of advertisement image data defined by the IAB).

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image formation apparatus that reconstructs and prints a document including text data and image data, based on document data written in a markup language,
   the document data including (i) one or more pieces of text data, (ii) text layout information for the one or more pieces of text data, and (iii) one or more pieces of image data attribute information that show identifiers of one or more pieces of image data respectively, locations of the one or more pieces of image data respectively, and image layout information for the one or more pieces of image data,
   the image formation apparatus comprising:
   a reconstructor operable, by using browser software, to arrange the one or more pieces of text data included in the document data within a page of the document according to the text layout information, and attempt to acquire the one or more pieces of image data from relevant servers according to the identifiers and the locations of the one or more pieces of image data and arrange acquired pieces among the one or more pieces of image data within the page of the document according to the image layout information;
   a judgment part operable, in a case where the reconstructor has failed to acquire some of the one or more pieces of image data, to judge whether each of the some of the one or more pieces of image data is important or not according to a corresponding piece of the image data attribute information;
   a controller operable to execute printing of the document reconstructed based on the one or more pieces of text data and/or the acquired pieces of image data if the judgment part judges negatively as to all of the some of the one or more pieces of image data that the reconstructor has failed to acquire, and to cancel the printing if the judgment part judges affirmatively as to any of the some of the one or more pieces of image data that the reconstructor has failed to acquire; and
   a storage that prestores therein locations of one or more pieces of low-importance image data, wherein
   if a location of a piece of image data that the reconstructor has failed to acquire is identical to any one of the locations of the one or more pieces of low-importance image data, the judgment part judges that the piece of image data that the reconstructor has failed to acquire is not important.

2. The image formation apparatus of claim 1, wherein
   if the image layout information shows that a piece of image data that the reconstructor has failed to acquire is to be arranged in a peripheral area of the page of the document, the judgment part judges that the piece of image data that the reconstructor has failed to acquire is not important.

3. The image formation apparatus of claim 1, wherein
   if the image layout information shows that a size of a piece of image data that the reconstructor has failed to acquire is smaller than a predetermined size, the judgment part judges that the piece of image data that the reconstructor has failed to acquire is not important.

4. The image formation apparatus of claim 1, wherein
   if an identifier of a piece of image data that the reconstructor has failed to acquire shows that the piece of image data is a movie, the judgment part judges that the piece of image data that the reconstructor has failed to acquire is not important.

5. An image formation apparatus that reconstructs and prints a document including text data and image data, based on document data written in a markup language,
   the document data including (i) one or more pieces of text data, (ii) text layout information for the one or more pieces of text data, and (iii) one or more pieces of image data attribute information that show identifiers of one or more pieces of image data respectively, locations of the one or more pieces of image data respectively, and image layout information for the one or more pieces of image data,
   the image formation apparatus comprising:
   a reconstructor operable, by using browser software, to arrange the one or more pieces of text data included in the document data within a page of the document according to the text layout information, and attempt to acquire the one or more pieces of image data from relevant servers according to the identifiers and the locations of the one or more pieces of image data and arrange acquired pieces among the one or more pieces of image data within the page of the document according to the image layout information;
   a judgment part operable, in a case where the reconstructor has failed to acquire some of the one or more pieces of image data, to judge whether each of the some of the one or more pieces of image data is important or not according to a corresponding piece of the image data attribute information; and
   a controller operable to execute printing of the document reconstructed based on the one or more pieces of text data and/or the acquired pieces of image data if the judgment part judges negatively as to all of the some of the one or more pieces of image data that the reconstructor has failed to acquire, and to cancel the printing if the judgment part judges affirmatively as to any of the some of the one or more pieces of image data that the reconstructor has failed to acquire;
   wherein
   the judgement part judges, for each piece of image data that the reconstructor has failed to acquire, whether or not a proportion of a count of locations that are identical with a location of the piece of the image data that the reconstructor has failed to acquire is smaller than a predetermined proportion with respect to a total count of the locations of the one or more pieces of image data included in the document data, and if judged affirmatively, judges that the piece of image data that the reconstructor has failed to acquire is not important.

6. An image formation method for use by an image formation apparatus that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data on respectively, and image layout information for the one or more pieces of image data, the image formation method comprising:

a reconstructor step of, by using browser software, arranging the one or more pieces of text data included in the document data within a page of the document according to the text layout information, and attempting to acquire the one or more pieces of image data from relevant servers according to the identifiers and the locations of the one or more pieces of image data and arranging acquired pieces among the one or more pieces of image data within the page of the document according to the image layout information;

a judgment step of, in a case where the reconstructor has failed to acquire some of the one or more pieces of image data, judging whether each of the some of the one or more pieces of image data is important or not according to a corresponding piece of the image data attribute information; and a controller step of executing printing of the document reconstructed based on the one or more pieces of text data and/or the acquired pieces of image data if the judgment step judges negatively as to all of the some of the one or more pieces of image data that the reconstructor step has failed to acquire, and to cancel the printing if the judgment step judges affirmatively as to any of the some of the one or more pieces of image data that the reconstructor step has failed to acquire;

wherein the image formation apparatus further comprises a storage that prestores therein locations of one or more pieces of low-importance image data, and if a location of a piece of image data that the reconstructor step has failed to acquire is identical to any one of the locations of the one or more pieces of low-importance image data, the judgment step judges that the piece of image data that the reconstructor step has failed to acquire is not important.

7. The image formation method of claim 6, wherein if the image layout information shows that a piece of image data that the reconstructor step has failed to acquire is to be arranged in a peripheral area of the page of the document, the judgment step judges that the piece of image data that the reconstructor step has failed to acquire is not important.

8. The image formation method of claim 6, wherein if the image layout information shows that a size of a piece of image data that the reconstructor step has failed to acquire is smaller than a predetermined size, the judgment step judges that the piece of image data that the reconstructor step has failed to acquire is not important.

9. The image formation method of claim 6, wherein if an identifier of a piece of image data that the reconstructor step has failed to acquire shows that the piece of image data is a movie, the judgment step judges that the piece of image data that the reconstructor step has failed to acquire is not important.

10. An image formation method for use by an image formation apparatus that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data on respectively, and image layout information for the one or more pieces of image data, the image formation method comprising:

a reconstructor step of, by using browser software, arranging the one or more pieces of text data included in the document data within a page of the document according to the text layout information, and attempting to acquire the one or more pieces of image data from relevant servers according to the identifiers and the locations of the one or more pieces of image data and arranging acquired pieces among the one or more pieces of image data within the page of the document according to the image layout information;

a judgment step of, in a case where the reconstructor has failed to acquire some of the one or more pieces of image data, judging whether each of the some of the one or more pieces of image data is important or not according to a corresponding piece of the image data attribute information;

a controller step of executing printing of the document reconstructed based on the one or more pieces of text data and/or the acquired pieces of image data if the judgment step judges negatively as to all of the some of the one or more pieces of image data that the reconstructor step has failed to acquire, and to cancel the printing if the judgment step judges affirmatively as to any of the some of the one or more pieces of image data that the reconstructor step has failed to acquire; and the judgement step judges, for each piece of image data that the reconstructor step has failed to acquire, whether or not a proportion of a count of locations that are identical with a location of the piece of the image data that the reconstructor step has failed to acquire is smaller than a predetermined proportion with respect to a total count of the locations of the one or more pieces of image data included in the document data, and if judged affirmatively, judges that the piece of image data that the reconstructor step has failed to acquire is not important.

11. An nontransitory computer readable medium encoded with a program to cause an image formation apparatus to execute a method that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data on respectively, and image layout information for the one or more pieces of image data, the image formation method comprising:

a reconstructor step of, by using browser software, arranging the one or more pieces of text data included in the document data within a page of the document according to the text layout information, and attempting to acquire the one or more pieces of image data from relevant servers according to the identifiers and the locations of the one or more pieces of image data and arranging acquired pieces among the one or more pieces of image data within the page of the document according to the image layout information;

a judgment step of, in a case where the reconstructor has failed to acquire some of the one or more pieces of image data, judging whether each of the some of the one or more pieces of image data is important or not according to a corresponding piece of the image data attribute information; and a controller step of executing printing of the document reconstructed based on the one or more pieces of text data and/or the acquired pieces of image data if the judgment step judges negatively as to all of the some of the one or more pieces of image data that the reconstructor step has failed to acquire, and to cancel the printing if the judgment step judges affirmatively as to any of the some of the one or more pieces of image data that the reconstructor step has failed to acquire;

wherein the image formation apparatus further comprises a storage that prestores therein locations of one or more pieces of low-importance image data, and if a location of a piece of image data that the reconstructor step has failed to acquire is identical to any one of the locations of the one or more pieces of low-importance image data, the judgment step judges that the piece of image data that the reconstructor step has failed to acquire is not important.

12. An nontransitory computer readable medium encoded with a program to cause an image formation apparatus to execute a method that reconstructs and prints a document including text data and image data, based on document data written in a markup language, the document data including (i) one or more pieces of text data, (ii) text layout information for the one or more pieces of text data, and (iii) one or more pieces of image data attribute information that show identifiers of one or more pieces of image data respectively, locations of the one or more pieces of image data on respectively, and image layout information for the one or more pieces of image data, the image formation method comprising:

a reconstructor step of, by using browser software, arranging the one or more pieces of text data included in the document data within a page of the document according to the text layout information, and attempting to acquire the one or more pieces of image data from relevant servers according to the identifiers and the locations of the one or more pieces of image data and arranging acquired pieces among the one or more pieces of image data within the page of the document according to the image layout information;

a judgment step of, in a case where the reconstructor has failed to acquire some of the one or more pieces of image data, judging whether each of the some of the one or more pieces of image data is important or not according to a corresponding piece of the image data attribute information;

a controller step of executing printing of the document reconstructed based on the one or more pieces of text data and/or the acquired pieces of image data if the judgment step judges negatively as to all of the some of the one or more pieces of image data that the reconstructor step has failed to acquire, and to cancel the printing if the judgment step judges affirmatively as to any of the some of the one or more pieces of image data that the reconstructor step has failed to acquire; and the judgement step judges, for each piece of image data that the reconstructor step has failed to acquire, whether or not a proportion of a count of locations that are identical with a location of the piece of the image data that the reconstructor step has failed to acquire is smaller than a predetermined proportion with respect to a total count of the locations of the one or more pieces of image data included in the document data, and if judged affirmatively, judges that the piece of image data that the reconstructor step has failed to acquire is not important.

* * * * *